United States Patent Office 2,703,748
Patented Mar. 8, 1955

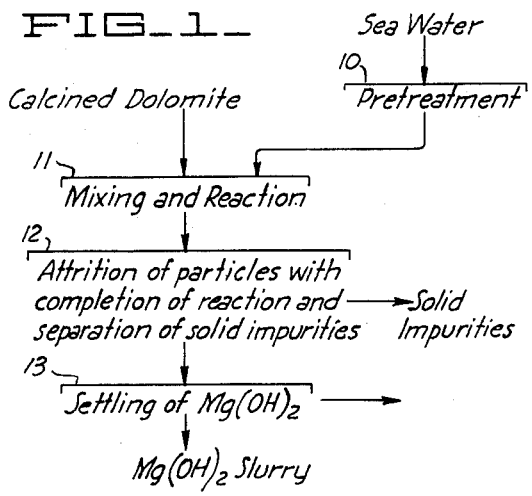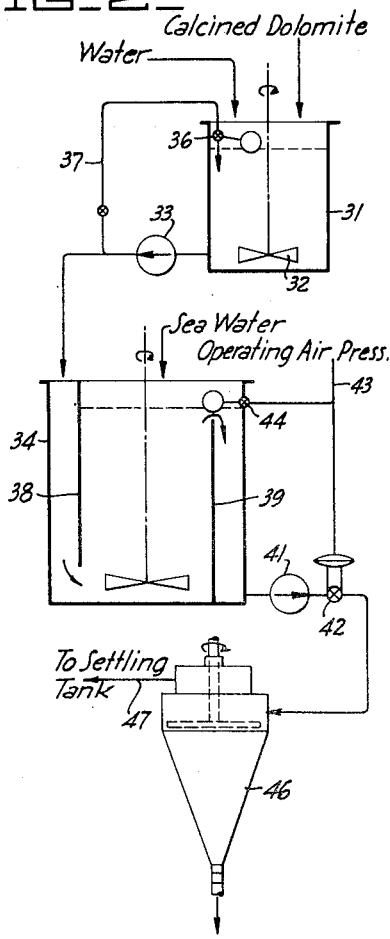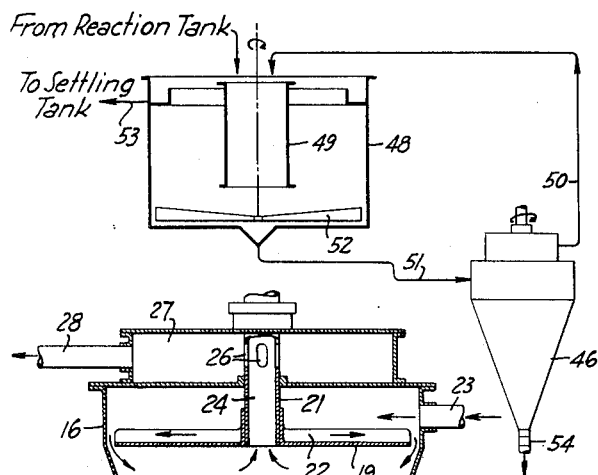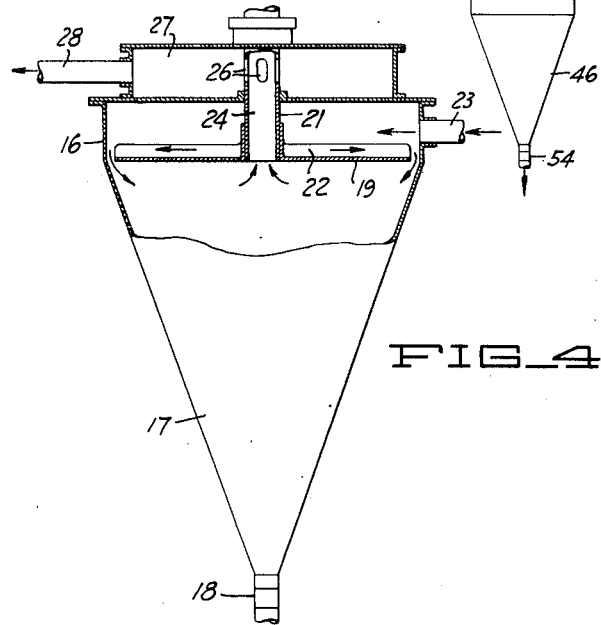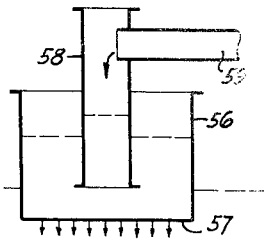

2,703,748

PROCESS FOR THE MANUFACTURE OF MAGNESIUM PRODUCTS

Robert E. Clarke, Palo Alto, and Neil R. Collins, Los Altos, Calif., assignors to Merck & Co., Inc., Rahway, N. J., a corporation of New Jersey Application April 23, 1951, Serial No. 222,476

3 Claims. (Cl. 23—201)

This invention relates generally to the manufacture of magnesium products, and particularly to processes involving the precipitation of magnesium hydroxide from sea water.

Sea water processes for the manufacture of magnesium compounds involve reacting the sea water with a lime containing precipitant, such as calcined lime or dolomite, after which the precipitated magnesium hydroxide is permitted to settle out and is withdrawn in a slurry for further treatment. For many industrial markets it is desirable to produce magnesium products having a relatively low percentage of calcium impurity. In order to reduce the calcium impurity in the precipitated magnesium hydroxide the sea water has been pretreated for the purpose of removing bicarbonate ion, which would otherwise react with lime in the main precipitating operation to form insoluble calcium carbonate. As disclosed in Clarke 2,276,245, pretreatment may be carried out by reacting the sea water with a sufficient amount of lime (or calcined dolomite) to precipitate calcium bicarbonate as calcium carbonate, and to react with a minor percentage (e. g. 12%) of the convertible magnesium salts to precipitate magnesium hydroxide. The precipitated solids are recirculated as an activated sludge to aid in completing the reaction with bicarbonate ion. Some of the calcium carbonate formed during such pretreatment remains in supersaturated solution. At varying succeeding stages of the process this dissolved calcium carbonate tends to precipitate from solution, thus adding to calcium contamination from other sources.

The precipitant employed in the main precipitating operation is likewise a source of calcium contamination. It contains various solid phase impurities such as sand, clay and other solid material, together with some calcium carbonate remaining from incomplete calcination of the limestone or dolomite employed. Assuming that one proceeds as set forth in Chesny 2,089,339 the lime or calcined dolomite is ground to a powder and slaked with water to form a slurry. Some solid phase impurities are then removed by screening, after which the slurry is reacted with the bulk of the brine for the main reaction. Such grinding, slaking and screening operations add considerably to the expense of the process and it is impractical to employ screens of sufficiently small mesh to remove the impurities as effectively as desired. Also during such slaking and screening operations the slurry is unavoidably subjected to excessive exposure to air containing carbon dioxide, which causes considerable recarbonation of the calcium hydroxide present.

After the main reaction of the precipitant with the bulk of the sea water, the precipitated magnesium hydroxide is permitted to settle out to form a slurry, which is then subjected to further purification. In addition to solid phase impurities which may be present in this slurry, the mother liquor contains dissolved contaminants, including particularly sodium chloride, calcium chloride and calcium sulphate. Such soluble salts can be removed by a suitable fresh water washing process, as for example the counterflow washing process disclosed in Farnsworth 2,019,488. Bicarbonate ion, carbonate ion, or dissolved carbon dioxide, any of which may be present in the wash water, may react with the soluble calcium salts to add to the solid phase calcium impurity in the magnesium hydroxide.

The cumulative effect of the various sources of contamination mentioned above is such that it is not uncommon in commercial practice of the process as disclosed in Chesny 2,089,339 to have a lime contamination of the order of 1.25% CaO (MgO basis), having reference to the magnesium hydroxide of the slurry as withdrawn from the main settling tank, and before further purification by washing. Such a slurry after being treated for purification by washing with fresh water, as for example by use of the process of Farnsworth 2,019,488, may have a residual lime contamination of the order of 1.3 to 1.4 percent (MgO basis). The increase in calcium content following settling of the magnesium hydroxide in a slurry occurs during handling and storage before washing, and is due to carbonation of calcium chloride and sulphate as mentioned above.

It is an object of the present invention to provide a sea water process for the manufacture of magnesium compounds which will make possible production of products of high purity, having reference particularly to calcium contamination.

Another object of the invention is to provide a process of the above character which is relatively economical for large scale commercial use, both with respect to operation of the process and the character of the equipment required.

Another object of the invention is to provide a process of the above character which will eliminate use of screening or other separating operations for the purpose of removing solid phase impurities from the precipitant.

Another object of the invention is to provide a process of the above character which makes possible a relatively high settling rate of the precipitated magnesium hydroxide while at the same time providing a magnesium hydroxide slurry of relatively high purity with respect to its calcium content, and which can be readily washed by counterflow contact with fresh water.

Additional objects and features of the invention will appear from the following description in which the preferred embodiments have been set forth in detail in conjunction with the accompanying drawing.

Referring to the drawing:

Figure 1 is a flow sheet illustrating one procedure for carrying out the process.

Figure 2 is a schematic view illustrating a part of the equipment which can be used in carrying out the process of Figure 1.

Figure 3 is a schematic view illustrating a modification of the equipment shown in Figure 2.

Figure 4 is a semi-diagrammatic side elevational view in section, illustrating one piece of equipment which can be used in connection with the present process.

Figure 5 is a diagrammatic view illustrating suitable means for introducing material into the main settling tank.

In carrying out the present process we prefer to use dolomite as a source of precipitant. It is desirable to select dolomite which is relatively pure with respect to undesired contaminants. The dolomite is calcined in such a manner as to convert substantially all of the calcium and magnesium carbonates to calcium and magnesium oxide. The calcining kiln employed may, for example, provide a calcining zone ranging from 2200 to 2400° F. for a retention period of about four hours. After calcining the material is crushed and screened to remove oversize material, such as fragments in excess of about 10 mesh. The bulk of the material after screening may range from about +200 to —10 mesh.

The sea water is subjected to pretreatment at 10 which can be carried out as set forth in Clark 2,276,245. Thus the sea water is reacted with a slurry of lime or calcined dolomite to precipitate calcium bicarbonate as solid phase calcium carbonate, and to react with a minor percentage (e. g. 12%) of the convertible magnesium salts. The sludge resulting from this reaction is continuously recirculated and contacted with the sea water, as described in Clarke 2,276,245, after which the sea water is clarified by settlement and filtration.

The pretreated sea water is supplied to the mixing and reaction operation 11, where it is reacted with the calcined dolomite. Preferably the dry granular dolomite, prepared as described above, is directly intermixed with the sea water. Instead of directly introducing the dolomite, it may first be mixed with water in a preceding operation to form a slurry which can be readily pumped to the main reaction operation. The amount of slaking taking place in the preparation of such a slurry is dependent upon such factors as time of retention, agitation and temperature. In general it is desirable to form the slurry primarily to enable pumping of the material, and preferably only a minor portion of the material is slaked before contact with sea water in the main reaction operation.

The reaction occurring in operation 11 takes place between the calcium oxide and/or calcium hydroxide of the dolomite or slurry, and the convertible magnesium salts of the sea water, namely magnesium chloride and magnesium sulphate. The amount of dolomite employed is controlled whereby sufficient calcium oxide and/or hydroxide is supplied to react with substantially all of the convertible magnesium salts present.

It is desirable to continuously agitate the material in operation 11 in order to avoid any substantial amount of settling out of the precipitated magnesium hydroxide. In other words the agitation is such that all of the solids present are maintained dispersed throughout the liquid.

The material from operation 11 is supplied to operation 12 where the reaction is completed and solid phase impurities removed. It may be explained that in operation 11 and before the reaction has been completed, some of the resulting solid phase material consists of soft masses of magnesium hydroxide containing some unreacted lime within their nuclei. The magnesium hydroxide is derived in part from the magnesium content of the dolomite and in part by reaction with the magnesium salts of the sea water. We have found that by subjecting such magnesium salts of the sea water masses to attrition by the method which will be presently described, they can be readily crushed to expose the calcium hydroxide in the nuclei to the remaining convertible magnesium salts. Once such a mass is crushed by attrition the reaction is rapidly completed, thus substantially eliminating any remaining calcium hydroxide. We have also found that by the method to be presently described, it is possible and highly desirable to simultaneously separate out the solid phase impurities, including particularly calcium carbonate and other solid phase impurities derived from the dolomite, such as sand, clay or other siliceous material, etc.

Following operation 12 the material is supplied to operation 13 for settling out the magnesium hydroxide. This operation can be carried out by the use of conventional settling tanks such as have been used in sea water processes. The slurry obtained from operation 12 is removed continuously or from time to time, for further treatment. Thus it can be further purified by counterflow washing as by employing the washing process disclosed in Farnsworth 2,019,488. After such purification it can be dewatered and calcined to form magnesium oxide, carbonated to form any one of several magnesium carbonates, or it can be processed to form various other magnesium compounds.

Figure 4 illustrates suitable apparatus for carrying out operation 12. It consists of a vessel 16 which is annular in cross sectional contour, and which has a lower conical shaped portion 17. The discharge pipe 18 at the lower end of the cone has a throat orifice which preferably can be adjusted as to cross-sectional flow area. In the upper part of the vessel there is a rotatable impeller 19 which is attached to the drive shaft 21. This impeller is provided with radially extending vanes 22. At one side of the vessel there is an inlet pipe connection 23, which delivers material into the region directly above the zone of operation of the impeller. The shaft 21 is hollow to provide a flow passage 24, and is provided with ports 26 to permit flow of material into the chamber 27 which communicates with the outlet pipe 28.

When the apparatus of Figure 4 is in operation, material to be treated is continuously supplied to the pipe 23, as from a suitable pump. The impeller 19 is continuously rotated, and material is continuously removed through the discharge pipe 28. Solid impurities discharge more or less continuously through the pipe 18. This pipe can be open to the atmosphere or it may be connected to a barometric leg. Generally the interior of the vessel 16 is maintained filled with liquid, although according to our observation a vortex pocket is always present below the impeller 19. Due to the rotation of the impeller, the material discharging from the pipe 23 is immediately acted upon by the vanes 22 to cause relatively violent localized turbulence. Rotary velocity is applied by the vanes to cause the material to move outwardly and downwardly about the periphery of the impeller. The body of material below the impeller is thus caused to swirl about the vertical axis of the vessel, whereby calcium carbonate, sand or other siliceous material, and like heavier solid phase impurities are caused to separate out and to be discharged through the pipe 18. The bulk of the material in the vessel 16 discharges continuously through the passage 24, through the ports 26 into the chamber 27, and then out through the pipe 28. The relatively soft masses previously described, having nuclei containing unreacted lime, are subjected to crushing and attrition in the zone of violent turbulence, thus releasing the unreacted calcium hydroxide for contact with the remaining magnesium salts of the sea water, with the result that reaction is completed within the vessel 16 before the material discharges through the pipe 28.

In actual practice about 90 to 95% of the convertible magnesium salts available in the pretreated sea water supplied to the reaction operation 11, are reacted with lime in this operation, and the remaining 5 to 10% of the convertible magnesium salts are reacted in operation 12 (i. e. in the apparatus of Figure 4). These percentages do not take into account a small percentage (e. g. 1 to 2%) of the total available magnesium salts which we prefer to leave unreacted by limiting the amount of precipitant employed.

Assuming the use of granular calcined dolomite as a precipitant, a magnesium hydroxide precipitate is obtained having a relatively rapid settling rate. For example in practice settling rates of the order of 12 inches or more per hour can be obtained. This greatly facilitates carrying out the settling operation 13 for producing a magnesium hydroxide slurry for further treatment. For a settling tank of given size, it is possible to secure relatively high capacity. Also it is possible to produce a magnesium hydroxide slurry in one such settling operation which is sufficiently concentrated for counterflow washing.

In Figure 2 we have shown suitable equipment for preliminary slaking of the dolomite and for the reaction 11. Thus granular calcined dolomite of suitable particle size is supplied to the vessel 31, which is provided with a suitable agitator 32. Suitable amounts of fresh or pretreated sea water are supplied as indicated. Slurry is removed from the lower part of tank 31 by pump 33, and delivered to the reaction tank 34. For the purpose of maintaining a constant level of material in tank 31, we prefer to employ a float operated valve 36, which connects with a pipe 37 leading from the discharge side of pump 33. When the liquid level in tank 31 falls, the rate of discharge through pipe 37 is automatically increased to maintain the desired level.

Tank 34 is provided with a partition 38 to define a downflow passage for receiving the incoming material. Another partition 39 forms a passage adapted to receive material at its upper end, and to deliver the material to the discharge pump 41. The tank is equipped with a suitable agitator as indicated. The rate of discharge from pump 41 can be controlled by the regulator valve 42, to maintain a constant level of material in tank 34. Thus we have diagrammatically illustrated a control valve of the motor operated type, having a pneumatically operated diaphragm connected to the air supply pipe 43. This pipe also connects with the float operated fluid valve 44, whereby controlled venting serves to vary the pneumatic pressure applied to the operating diaphragm of the valve 42, in accordance with changes in liquid level. Pump 41 discharges directly into the apparatus 46, which corresponds to the apparatus illustrated in Figure 4, and the discharge line 47 from this apparatus leads to the settling tank.

When preliminary mixing of the calcined dolomite with water is omitted, the dry granular material is fed directly to the tank 34 at a controlled rate.

In the arrangement illustrated in Figure 2 the apparatus 46 must have a sufficient capacity to handle and treat all of the discharge from the reaction tank 34. In the modification illustrated in Figure 3, the apparatus 46 is utilized in conjunction with a more conventional hydraulic classifier. The classifier 48 which is illustrated has a central open ended feed vessel 49 adapted to receive material from the reaction tank as indicated. The heavier solid particles in the material from the reaction tank tend to settle out to the bottom of the classifier, and to be urged inwardly to the discharge line 51 by the stirring rakes 52. Flow line 51 delivers material to the apparatus 46, which has its discharge side connected by line 50 back to the classifier 48. The overflow discharge 53 from the classifier 48 delivers material to the settling tank. Solid phase impurities separated out by the apparatus 46 are indicated as being removed at 54.

With the apparatus of Figure 3 the heavier solid phase material from the reaction tank, which includes particularly particle of unreacted lime and undesired solids such as siliceous matter, etc., find their way to the bottom of the classifier tank and are delivered to apparatus 46 through the line 51. In apparatus 46 the action takes place as previously described with reference to Figure 4. Masses containing unreacted lime are subjected to crushing and attrition, the reaction with convertible magnesium salts is rapidly completed, and undesired heavier solid phase impurities are separated out and removed. Line 50 returns material to the classifier 48. It will be evident that the amount of the material sent to the apparatus 46 by way of line 51 can be a fraction of the material being received from the reaction tank.

When the material from apparatus 46 is introduced into the main settling tank, care must be taken to avoid undue turbulence such as would interfere with proper settling of the magnesium hydroxide. Good results have been obtained by equipping the settling tank (not shown) with a central feed chamber 56, which has a perforated bottom wall 57, and which is partly submerged in the liquid within the tank. A vertical casing 58 has its lower open end terminating within the chamber 56, and receives material discharging from the conduit or launder 59. The flow through this conduit is the discharge from apparatus 46. The mixture of mother liquor and precipitated magnesium hydroxide flows downwardly through the casing 58 and establishes a level in the chamber 56. From this chamber it flows downwardly through the perforated bottom wall 57 and into the main settling tank, without undue turbulence.

One example of commercial practice according to the present process is as follows: A good quality of dolomite was calcined in a calcining zone at a temperature of about 2400° F. for a period of 4 hours to produce a calcine analyzing as follows:

| | Per cent (weight) |
|---|---|
| CaO | 61.72 |
| MgO | 34.72 |
| $CO_2$ | 0.92 |
| Chlorides as NaCl | 0.02 |
| Sulphates as $SO_3$ | 0.014 |
| $SiO_2$ | 0.08 |
| $Fe_2O_3$ | 0.02 |
| $Al_2O_3$ | 0.08 |
| Ignition loss | 2.20 |

The above calcine was crushed and screened to provide a coarse granular material having a screen analysis as follows:

| | Per cent (weight) |
|---|---|
| −10+20 in. mesh | 18.4 |
| −20+35 | 2.6 |
| −35+65 | 45.2 |
| −65+100 | 17.0 |
| −100+200 | 14.5 |
| −200 | 2.3 |

In a preliminary operation the above calcined material was mixed with pretreated sea water in proportions corresponding to .25 lb. of calcined dolomite for each gallon of sea water. The amount of sea water used in this operation amounted to 10% of the total quantity of sea water being supplied to the process. The slurry obtained from this operation was pumped continuously to the reaction tank 34, where it was intermixed with the remainder (i. e. 90%) of the pretreated sea water. In the tank 34 the mixture was subjected to continuous agitation with a total effective time period of retention of 10 minutes. The amount of available calcium oxide and/or hydroxide contained in the slurry supplied to the tank 34 was theoretically equal to the amount required for substantially complete reaction with the convertible magnesium salts in the sea water, having reference to the convertible magnesium salts present after the pretreatment previously mentioned. An analysis of the material continuously removed from tank 34 by way of pump 41 revealed that about 92% of the available calcium hydroxide had reacted, leaving about 8% unreacted. Apparatus 46 was operated with a speed of rotation for the impeller 19 which provided a peripheral velocity of 2500 feet per minute. The effective time period of retention within the apparatus 46 was about 3 seconds. Analysis of the material discharging from apparatus 46 revealed that all of the remaining available calcium hydroxide had reacted with remaining magnesium salts in the apparatus 46. In other words the reaction was substantially 100% completed. The material from apparatus 46 was immediately delivered to a conventional settling tank and it was noted that the magnesium hydroxide had a settling rate of about 12 inches per hour. After a period of settlement a slurry was removed from the lower end of the tank having a concentration of 24% solids. This slurry was washed by the counterflow method described in Farnsworth 2,019,488, using relatively pure wash water, after which it was dewatered and calcined. The resulting magnesium oxide analyzed as follows:

| | Per cent (weight) |
|---|---|
| MgO | 98.20 |
| CaO | 0.30 |
| Chlorides as NaCl | 0.03 |
| Sulphates as $SO_3$ | 0.55 |
| $SiO_2$ | 0.15 |
| $Fe_2O_3$ | 0.025 |
| $Al_2O_3$ | 0.075 |
| Ignition loss | 0.54 |

It will be evident from the above example that our process makes possible production of magnesium compounds which are relatively pure with respect to calcium contamination, at the same time the process makes possible the use of relatively high settling rates which simplifies attainment of high operating capacity with given equipment, and facilitates counterflow washing of the magnesium hydroxide slurry. Expensive and troublesome fine screening of slaked precipitant is completely omitted and all removal of solid phase impurities is carried out by apparatus 46. Elimination of impurities is attributed not only to the action of the apparatus 46, but also to the overall character of the process, which greatly reduces the time period of the several treatment operations from the commencement of the sea water treatment to the removal of the desired magnesium hydroxide slurry. By the use of the present process it is possible to produce relatively pure magnesium compounds having a calcium content ranging from 0.3 to 0.75% (MgO basis).

The use of calcined dolomite is desirable because this material makes possible a relatively high settling rate for the precipitated magnesium hydroxide. However, in place of calcined dolomite, it is possible to utilize other calcined materials having an available calcium hydroxide content, or it is possible to use calcined lime stone with a sacrifice in the settling rate obtained. Although the process makes possible the use of calcined dolomite in granular form, it is relatively efficient as to its consumption of dolomite. In other words, the amount of dolomite sent to waste (from the apparatus of Figure 4) is relatively small and if desired this can be recovered by hydraulic classification.

While the apparatus illustrated in Figure 4 is desirable for the operation 12, it is possible to utilize other types of equipment capable of operating in a similar way. Essentially any apparatus used for this purpose must subject the incoming material to intense localized turbulence for attrition and crushing of soft masses containing reacted lime. In addition the apparatus should subject the material to thorough inter-mixture for promoting rapid completion of the reaction, and to separating forces for effective removal of calcium carbonate, particles of siliceous material and the like. By way of example we have employed apparatus known in the trade as a "Dorrclone" and which is somewhat similar to the apparatus of Figure 4. However, the impeller 19 is omitted and the feed is pumped into the treatment chamber through a tangentially connected inlet pipe. Intense turbulence with attrition takes place in the upper portion of the chamber, while swirling action in the main part of the chamber causes a separation of the solid impurities. The outflow occurs through a central adjusted pipe in place of the shaft 21.

We claim:
1. In a process for the manufacture of magnesium products by precipitation of magnesium hydroxide from sea water, the steps of reacting the sea water with a lime containing precipitant together with agitation to prevent substantial settling of resulting magnesium hydroxide, causing the resulting material to flow continuously into the upper portion of a treatment chamber, rapidly impelling the material as it is introduced into the chamber to cause the material in the upper portion of the chamber to rotate with turbulence and breaking up of masses containing unreacted lime, said last step being immediately followed by flow of the material into the main portion of the chamber with swirling movement to effect centrifugal separation of solid phase impurities, continually removing separated solid phase impurities from said chamber, continuously removing the remaining material from the chamber, and then subjecting said last named material to gravity settlement for removal of a magnesium hydroxide slurry therefrom.

2. In a process for the manufacture of magnesium hydroxide from sea water, the steps of reacting the sea water with a lime containing precipitant together with agitation to prevent substantial settling of resulting magnesium hydroxide, causing the resulting material to flow continuously into the upper portion of a treatment chamber with rapid rotation within the chamber and with turbulence and breaking up of masses containing unreacted lime, said last step being immediately followed by flow of the material into the main portion of the chamber with swirling movement to effect centrifugal separation of solid phase impurities, continually removing separated solid phase impurities from said chamber, continuously removing the remaining material from the chamber, and then subjecting said last named material to gravity settlement for removal of a magnesium hydroxide slurry therefrom.

3. In a process for the manufacture of magnesium products by precipitation of magnesium hydroxide from sea water, the steps of pre-treating the sea water by reacting the same with a lime containing precipitant to substantially remove bicarbonate ion and to precipitate a minor percentage of the available magnesium salts present, clarifying the pre-treated sea water by removal of solid phase material therefrom, reacting the pre-treated sea water with calcined dolomite while subjecting the material to agitation to prevent substantial settling of resulting magnesium hydroxide, continuously flowing a stream of the resulting material with the precipitated magnesium hydroxide suspended therein to a zone in which the material is subjected to momentary localized attrition to cause crushing of masses containing unreacted lime and to cause rapid completion of the reaction, said localized attrition being carried out by imparting rotary velocity to the material with turbulence, continuously removing the material from the zone of attrition and immediately thereafter subjecting the material to swirling for centrifugal removal of solid phase impurities from the precipitated magnesium hydroxide, and then subjecting the remaining material to gravity settlement for removal of a magnesium hydroxide slurry.

References Cited in the file of this patent
UNITED STATES PATENTS

| | | |
|---|---|---|
| 2,089,339 | Chesny | Aug. 10, 1937 |
| 2,276,245 | Clarke | Mar. 10, 1942 |
| 2,479,138 | Scoles | Aug. 16, 1949 |
| 2,493,752 | De Maestri | Jan. 10, 1950 |
| 2,595,314 | Vettel et al. | May 6, 1952 |